Oct. 25, 1955     R. C. AVERY     2,721,903

LINE SELECTION SYSTEM

Filed May 6, 1952     4 Sheets-Sheet 1

| FIG. 1 | FIG. 2 |
|---|---|
| FIG. 3 | FIG. 4 |

INVENTOR
R. C. AVERY
BY
R.C. Terry
ATTORNEY

Oct. 25, 1955 — R. C. AVERY — 2,721,903
LINE SELECTION SYSTEM
Filed May 6, 1952 — 4 Sheets-Sheet 3

INVENTOR
R. C. AVERY
BY
R. C. Terry
ATTORNEY

Oct. 25, 1955        R. C. AVERY        2,721,903
LINE SELECTION SYSTEM
Filed May 6, 1952        4 Sheets-Sheet 4

INVENTOR
R. C. AVERY
BY
R. C. Terry
ATTORNEY

United States Patent Office 2,721,903
Patented Oct. 25, 1955

2,721,903

LINE SELECTION SYSTEM

Robert C. Avery, Jackson Heights, N. Y., assignor to Bell Telephone Laboratories, Incorporated, New York, N. Y., a corporation of New York Application May 6, 1952, Serial No. 286,265

12 Claims. (Cl. 179—18)

This invention relates to testing systems and apparatus and particularly to the testing of the insulation on electrical conductors.

Still more specifically the invention relates to the testing of telephone subscriber lines.

The invention is particularly applicable to the automatic testing of the subscriber lines of an automatic telephone switching system of the kind shown in Patent 2,531,615 granted November 28, 1950, to E. L. Erwin, and the disclosure of that patent is incorporated herein by reference as part of the present specification. It should be understood that the invention is applicable to the testing of insulation on conductive lines of other types of systems and is not limited to the testing of lines of the particular system shown in the Erwin patent.

An object of the invention is to select the subscriber lines according to a fixed pattern by chains of relays.

Another object of the invention is to check that the next relay in a chain has operated before the preceding relay is released.

Another object of the invention is to check the return of a relay chain to normal when the succeeding chain is advancing.

Another object of the invention is to recycle the frame advance counter at an intermediate point.

The present specification describes and the accompanying drawings disclose in detail the several relay chain circuits of an insulation test control circuit that is completely disclosed in application, Serial No. 286,266, filed on even date with the present specification, by R. C. Avery. Specific details of the relay chain circuits and of the manner in which they control the seizure of lines to be tested are claimed herein and are not claimed independently and apart from the complete system in said application, Serial No. 286,266. Only as much of the details of the insulation test control circuit as is necessary to convey a complete understanding of the mode of operation of the relay chain circuits is included in the present specification and reference may be had to application, Serial No. 286,266 for a complete understanding of the entire insulation test control circuit.

In accordance with the present invention the program of seizing lines to be tested is controlled by four chains of relays which are designated by the titles Frame Units, Frame Tens, Vertical Group and Horizontal Group. The frame units chain of relays comprises ten relays and each relay controls the seizure of a group of five lines. These lines are seized simultaneously as a group and are individually connected to the test circuit in succession by five Vertical File relays.

The frame tens chain of relays may vary in accordance with the size of the switching office. In the arrangement described herein the chain comprises six relays, whereas in the arrangement described in the aforementioned application, Serial No. 286,266, the chain comprises four relays. When a testing cycle is initiated the first relay in the frame tens relay chain operates substantially concurrently with the first relay in the frame units chain and remains operated until the frame units chain has completed a full cycle, its ten relays having operated in succession to seize a total of fifty subscriber lines. The frame tens relay chain then advances to the second relay and incident to this advancement the frame units relay chain advances to its starting condition with the first relay of the chain operated.

The vertical group chain of relays comprises twelve relays. At the beginning of a testing cycle the first relay in the chain operates substantially concurrently with the first relays in the frame units and frame tens relay chains and remains operated until the testing program reaches a condition in which the last relay in each of the frame units and frame tens relay chains is operated, signifying the completion of testing of 300 lines. The vertical group relay chain then advances to its second relay and incident to that advancement the frame units and frame tens relay chains advance to their initial conditions with the first relay in each chain operated. The second relay in the vertical group relay chain remains operated until the condition is again reached in which the last relay in each of the frame units and frame tens relay chains is operated whereupon the vertical group relay chain advances to its third relay.

The horizontal group relay chain comprises ten relays. The first relay in that chain is operated substantially concurrently with the first relay of each of the other three chains and remains operated until the testing program has reached a condition in which the last relay of each of the other three chains of relays is operated, indicating the completion of the testing of 3,600 lines. Thereupon the horizontal group relay chain advances to its second relay and incident thereto the other three chains advance to their initial conditions. This procedure continues until the testing program reaches the condition in which the last relay in each of the four chains is operated, indicating the completion of the testing of 36,000 lines. When this condition of the relay chains has been reached the testing cycle of the insulation test control circuit has been completed and the entire system restores to normal, the last relay in each of the four chains being released in the restoration process.

Circuits are provided for checking the operation of the several relay chains each time that they advance from one to another of their relays and the checking is based upon a mode of operation in accordance with which the next relay in the chain operates before the previously operated relay releases, so that there is an interval in which two successive relays in the chain are simultaneously operated and a check is made that two relays are in fact operated.

For a complete understanding of the invention reference may be had to the following detailed description to be considered in connection with the accompanying drawings, in which.

Figures 1, 5:
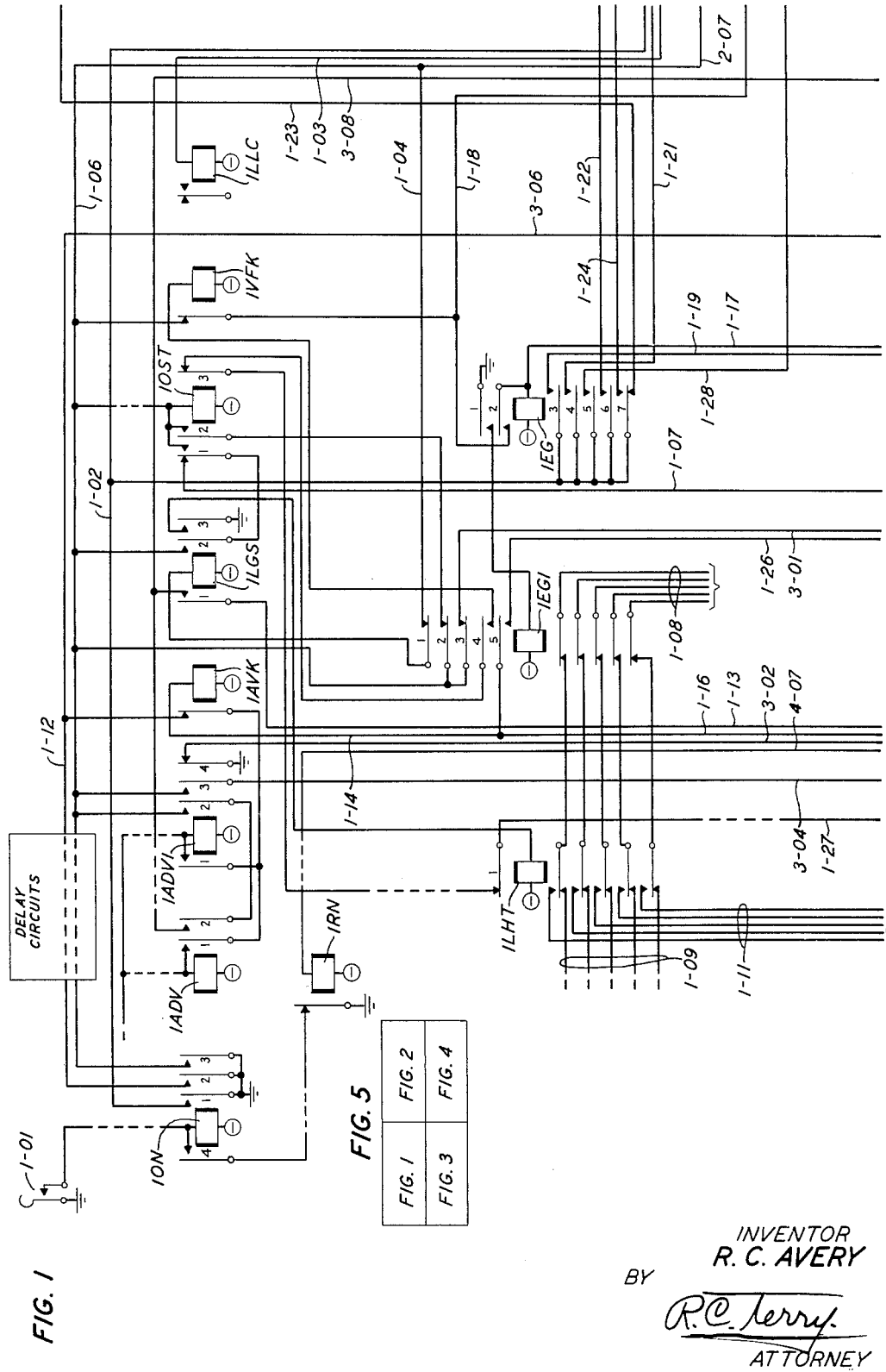
Fig. 1 shows schematically certain of the circuits of the insulation test control system which control the operation of the relay chain circuits.
Fig. 5 shows how Figs. 1 to 4 inclusive are to be arranged to represent a complete insulation test control circuit as fully and completely disclosed in application, Serial No. 286,266.
Figure 2:
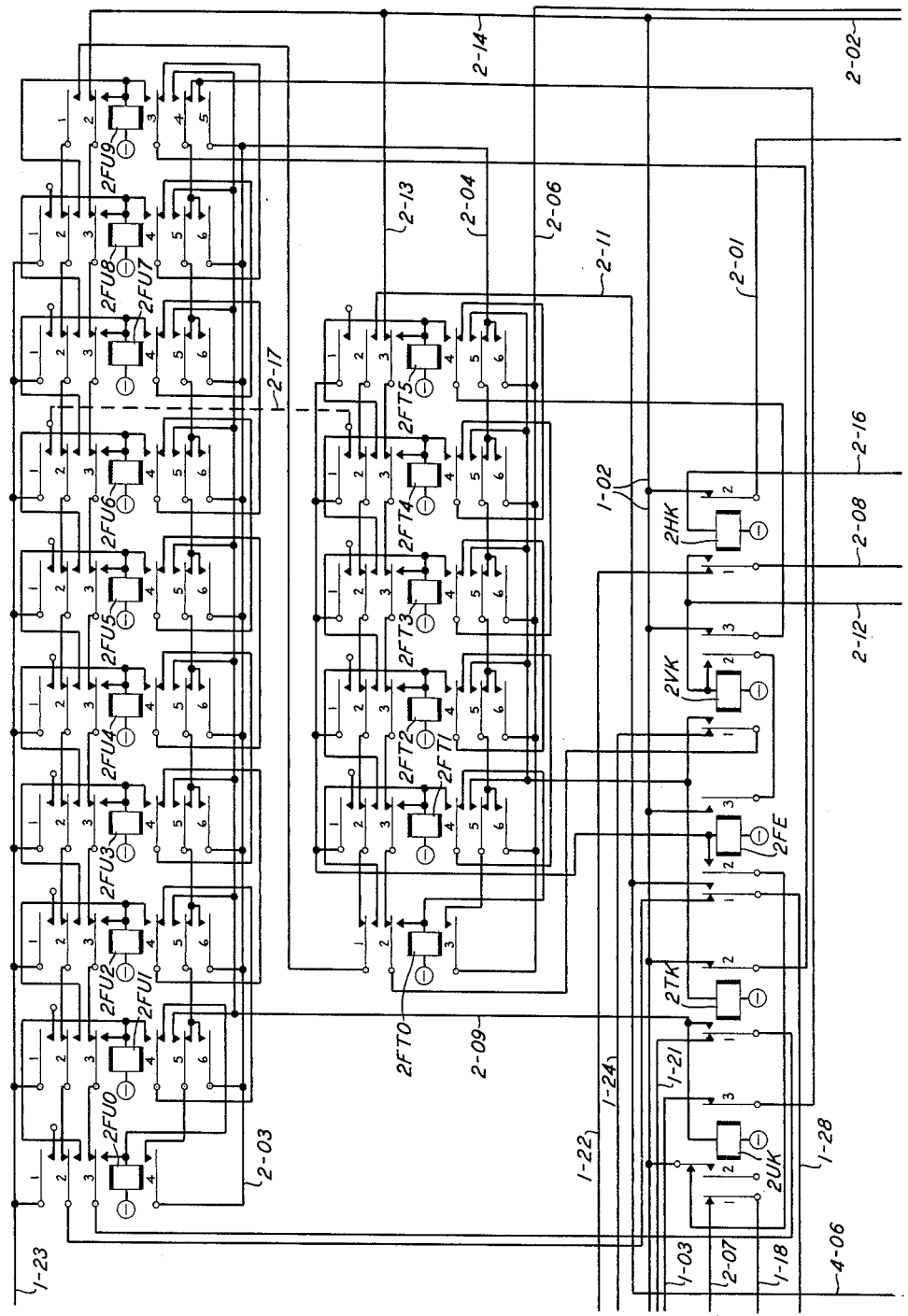
Fig. 2 shows the circuits of the frame units and frame tens relay chains and the checking circuits for checking the proper operation of the relay chains.

As is disclosed in application, Serial No. 286,266, the initiation of a line testing cycle of the insulation test control circuit is effected by the momentary operation of one of a plurality of manually operable keys, each of which causes a particular one of a plurality of tests to be made in one of a plurality of resistance ranges. Key 1–01, in Fig. 1, represents any one of those keys. Key 1–01 completes the circuit of off-normal relay 1ON which operates. Certain operations initiated by the operation of the keys, which key 1–01 represents, intervene the key operation and the operation of relay 1ON so that the energizaion of that relay may be said to be an indirect result of the momentary key closure. This has been indicated in Fig. 1 by the dotted portion of the path from key 1–01 to the winding of relay 1ON. Relay 1ON locks under the control of relay 1RN in a path including the armature 4 and front contact of relay 1ON. The indirect nature of the control of the locking path by relay 1RN is indicated by the dotted portion of that path.

At its armature 1 and front contact relay 1ON connects ground over conductor 1–02, back contact and right-hand armature of relay 2TK, armature 3 and back contact of relay 2FU9, chain circuit through the armatures 4 and back contacts of relays 2FU8, 2FU7, 2FU6, 2FU5, 2FU4, 2FU3, 2FU2, 2FU1 and winding of relay 2FU0 to battery and that relay operates.

A path is also traced from grounded conductor 1–02 through the back contact and armature 3 of relay 2VK, armature 4 and back contact of relay 2FT5, chain circuit through the armatures 4 and back contacts of relays 2FT4, 2FT3, 2FT2, 2FT1 and winding of relay 2FT0 to battery and that relay operates.

Another circuit is traced from grounded conductor 1–02 through the back contact and armature 2 of relay 2HK, conductor 2–01, armature 3 and back contact of relay 4VG11, chain circuit through the armatures 3 and back contacts of relays 4VG10, 4VG9, 4VG8, 4VG7, 4VG6, 4VG5, 4VG4, 4VG3, 4VG2, 4VG1 and winding of relay 4VG0 to battery and that relay operates.

Another path is traced from conductor 1–02 over conductors 2–02 and 4–04, armature 3 and back contact of relay 4HG9, chain circuit through the armatures 3 and back contact of relays 4HG8, 4HG7, 4HG6, 4HG5, 4HG4, 4HG3, 4HG2, 4HG1 and winding of relay 4HG0 to battery and that relay operates.

Relays 2FU0, 2FT0, 4VG0 and 4HG0 select a particular group of five lines as the first to be tested, this being the line group which is located by group designations H–0, V–0 in line link frame 00. For the purpose of checking that only one relay in each of the four relay chains is operated, the circuit of relay 1LLC is completed, the circuit being traced from battery, through conductor 1–03, back contact and armature 3 of relay 2UK, back contact and armature 4 of relay 2FU9, chain circuit through the back contacts and armatures 5 of relays 2FU8 to 2FU1, front contact and armature 4 of relay 2FU0, conductors 2–03 and 2–04, chain circuit through the back contacts and armatures 5 of relays 2FT5 to 2FT1, front contact and armature 3 of relay 2FT0, conductor 2–06, chain circuit through the back contacts and armatures 4 of relays 4VG11 to 4VG1, front contact and armature 3 of relay 4VG0, conductors 4–01 and 4–02, chain circuit through back contacts and armatures 4 of relays 4HG9 to 4HG1, front contact and armature 3 of relay 4HG0, conductors 4–03, 4–04, 2–02 and 1–02 to ground, and the relay 1LLC operates. Relay 1LLC initiates a sequence of operations involving relays in the line link frame connector and in the line link frame itself to cause the seizure of the first group of lines to be tested. Certain time intervals are included in the sequence of operations in order to provide adequate time for various tests, busy test and others, and for the operation of certain relays. In the course of these operations, relay 1LGS operates in a path traced from battery, through its winding, armature 1 and back contact of relay 1EG1, conductors 1–04 and 1–06 and front contact and armature 3 of relay 1ON to ground, conductor 1–06 being connected to the front contact of the relay through a dotted line section contained within a rectangle designated "delay circuits" which indicates that a series of operations occur between the operation of relay 1ON and the connection of ground to conductor 1–06.

Figure 3:
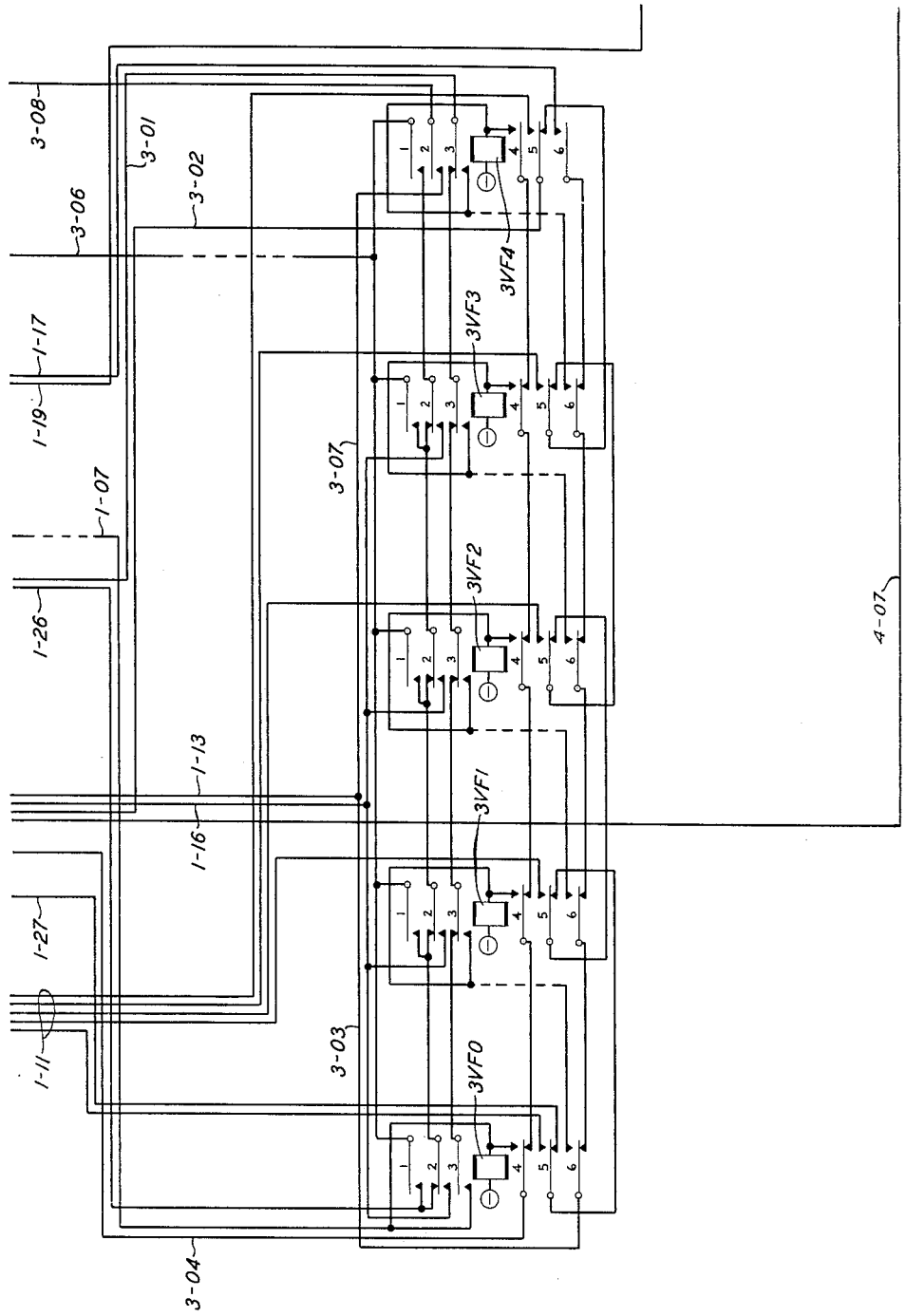
Fig. 3 shows the circuits of the vertical file relays by which the five lines of a seized group are successively connected to the insulation test circuit.
Figure 4:
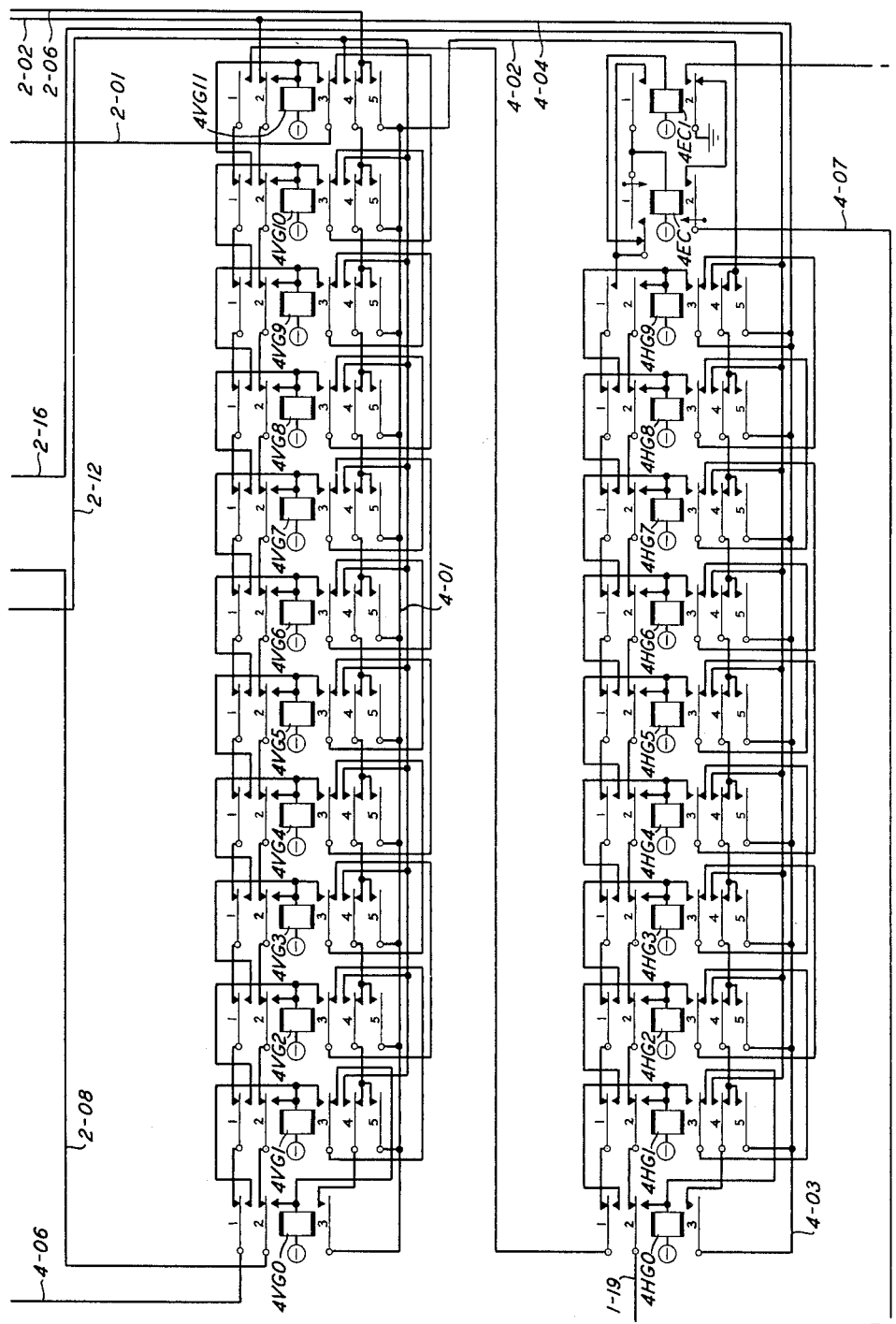
Fig. 4 shows the circuits of the vertical group and horizontal group relay chains.

With relay 1LGS operated, a circuit is traced from grounded conductor 1–06 through its front contact and armature 2, back contact and armature 1 of relay 1OST, conductor 1–07 which has a dotted line section in the portion of Fig. 3 indicating intermediate controls which may, under certain circumstances, affect the path, as described in application, Serial No. 286,266, the path then being extended through the winding of vertical file relay 3VF0 to battery, and this relay operates. Relay 3VF0 locks in a circuit traced through its front contact and armature 3, chain circuit through back contacts and armatures 3 of relays 3VF1, 3VF2, 3VF3 and 3VF4, conductor 3–01, back contact and armature 3 of relay 1EG1 to grounded conductor 1–06. Relay 1LGS also operates relay 1LHT in a circuit traced from ground through the armature 3 and front contact of relay 1LGS and the winding of relay 1LHT to battery. This relay transfers line hold conductors 1–08 that are connected to the lower armatures of relay 1EG1 from line busy test conductors 1–09 that are connected to the back contacts associated with the lower armatures of relay 1LHT to the conductors 1–11 that are connected to the front contacts associated with the lower armatures of relay 1LHT and that extend to the front contacts associated with the armatures 5 of relays 3VF0 to 3VF4. Since the relay 3VF0 is operated, the line hold path is extended over its front contact and armature 5, chain circuit through the back contacts and armatures 5 of relays 3VF1 to 3VF4, conductor 3–02 and back contact and armature 4 of relay 1ADV1 to ground. In the opposite direction, through the associated one of the conductors 1–08, the path is extended to the line link frame (not shown) to operate the hold magnet for connecting to the test circuit the first of the five lines of the group that has been seized.

After the hold magnet has been operated a double connection test is made to detect false selection of a busy line link. The double connection test involves a sequence of operations including the operation of relay 1OST which receives ground from conductor 1–06 through a dotted line section to indicate that the operation of relay 1OST is dependent on a sequence of operations subsequent to the grounding of conductor 1–06. Relay 1OST locks in a path traced through its front contact and armature 1 and the armature 2 and front contact of relay 1LGS to conductor 1–06. A parallel locking circuit for relay 1OST is traced through its front contact and armature 2 and the back contact and armature 2 of relay 1EG1 to conductor 1–06. Relay 1OST interrupts at its armature 1 and back contact the path over which relay 3VF0 was operated to prevent interference when succeeding ones of the relays 3VF1 to 3VF4 are operated.

The test circuit proceeds with the testing of the line that has been connected, and if the line passes the test, or upon the making of certain retests and the recording of a trouble indication, in the event that a fault is found, the circuits of relays 1ADV and 1ADV1 are completed and these relays operate. Relays 1ADV and 1ADV1 lock in paths traced from their windings through their front contacts and armatures 1 and the armature and back contact of relay 1AVK, conductor 1–12 and front contact and armature 2 of relay 1ON to ground, a dotted section of this conductor within the rectangle designated "delay circuits" indicating timing preceding the grounding of conductor 1–12.

With relays 1ADV and 1ADV1 operated, ground is extended from conductor 1–06 through the front contact and armature 2 of relay 1ADV1, armature 2 and front contact of relay 1ADV, front contact and armature 1 of relay 1LGS, a dotted section being included between the make contacts of relay 1ADV and make contacts of relay 1LGS, to indicate other control contacts in the path, conductors 1–13 and 3–03, armature 6 and front contact of relay 3FV0, and winding of relay 3FV1 through a dotted section indicating other control contacts, and assuming that these control contacts are closed, relay 3VF1 operates. The circumstance under which the relay 3VF1 would be prevented from operating by the control contacts intermediate its winding and the make contacts of relay 3FV0 is that the second line of the group of five, the connection of which to the testing circuit is controlled by relay 3VF1, has tested busy. It will be assumed that it is not busy and that relay 3VF1 operates. This relay locks in a path traced from its winding, through its front contact and armature 3 and thence to ground over the previously traced holding path for relay 3VF0. Relay 3VF1 interrupts the previously traced holding circuit for relay 3VF0 at its armature 3 but relay 3VF0 now has a holding circuit traced through its front contact and armature 4, conductor 3–04 and armature 3 and front contact of relay 1ADV1 to grounded conductor 1–06 and relay 3FV0 remains operated.

With any two of the relays 3VF0 to 3VF4 operated, as a specific instance the relays 3VF0 and 3VF1, an energizing circuit for relay 1AVK is completed, the circuit being traced from battery through the winding of that relay, conductors 1–14 and 1–16, front contact and armature 2 of relay 3VF0, front contact and armature 1 of relay 3VF1 and conductor 3–06 to grounded conductor 1–12, the path through conductor 3–06 including a dotted section to indicate points in the path at which other controls are exercised. Operation of the relay 1AVK indicates that the circuit has advanced for testing the next line in the group. At its armature and back contact it interrupts the hold circuits for relays 1ADV and 1ADV1 which release. Relay 1ADV1 interrupts at its armature 3 the locking circuit for relay 3VF0 which releases. Relay 3VF0 interrupts at its armature 2 the energizing circuit for relay 1AVK which releases leaving relay 3VF1 locked.

Relay 3VF1 effects the connection of the next line in the group to the insulation test control circuit and that line is tested. Upon completion of the test, relays 1ADV and 1ADV1 again operate and lock which causes relay 3VF2 to operate in a path traced from its winding through the front contact and armature 6 of relay 3VF1 and the back contact and armature 6 of relay 3VF0 to conductor 3–03 which is grounded through conductor 1–13 and the front contact and armature 1 of relay 1LGS. Relay 3VF1 remains locked through its front contact and armature 4, the back contact and armature 4 of relay 3VF0, conductor 3–04 and armature 3 and front contact of relay 1ADV1 to grounded conductor 1–06. Again the circuit of relay 1AVK is completed, this time through the front contact and armature 2 of relay 2FV1 and the front contact and armature 1 of relay 3VF2. Relay 1AVK interrupts the locking circuit for relays 1ADV and 1ADV1 which release. Relay 1ADV1 releases relay 3VF1 which releases relay 1AVK. Relay 3VF2 remains operated and connects the next line in the group for the testing of its insulation.

The above described process continues until the last line in the group has been tested whereupon the relays 1ADV and 1ADV1 operate and complete an energizing circuit for relay 1EG, traced from battery through the winding of that relay, conductor 1–17, front contact and armature 6 of relay 3VF4, chain circuit through the back contacts and armatures 6 of relays 3VF3, 3VF2, 3VF1 and 3VF0 and conductor 3–03 from which parallel paths are traced, one comprising conductor 1–13 and armature 1 and front contact of relay 1LGS, and the other comprising conductor 3–07, front contact and armature 2 of relay 3VF4, and conductor 3–08 to the front contact associated with armature 1 of relay 1LGS, the circuit then continuing through the front contact and armature 2 of relay 1ADV and the armature 2 and front contact of relay 1ADV1 to grounded conductor 1–06. Relay 1EG operates and locks in a circuit traced through its armature 2 and front contact and the armature and back contact of relay 1VFK to grounded conductor 1–06. Another locking path is traced through the same armature and front contact of relay 1EG and conductor 1–18, armature 1 and back contact of relay 2UK, and conductor 2–07 to grounded conductor 1–06. At its armature 1 relay 1EG completes the circuit of relay 1EG1 which operates. At its armature 3 the relay 1EG connects ground over conductor 1–19 and the armature 2 and front contact of relay 4HG0 to provide a locking circuit for that relay. At its armature 4 the relay 1EG connects ground over conductor 1–21, back contact and armature 1 of relay 2TK and armature 3 and front contact of relay 2FU0 to lock that relay. At its armature 5 relay 1EG extends a ground connection over conductor 1–28, armature 1 and back contact of relay 2FE, armature 2 and front contact of relay 2FU0 and winding of relay 2FU1 to battery and the latter relay operates. At its armature 6 relay 1EG connects ground over conductor 1–22, back contact and armature 1 of relay 2HK, conductor 2–08 and armature 2 and front contact of relay 4VG0 to lock that relay. At its armature 7 relay 1EG disconnects ground from conductor 1–23 to which the armatures 1 of the relays 2FU0 to 2FU9 are connected, these armatures being engageable with their front contacts for a purpose which will be described later. At the front contact associated with armature 7 of relay 1EG ground is extended over conductor 1–24, back contact and armature 1 of relay 2VK and armature 2 and front contact of relay 2FT0 to lock that relay. It follows from the foregoing description that the first relay in each of the four relay chains is held locked and the second relay in the first chain, which is relay 2FU1, is operated.

At its five lower armatures relay 1EG1 disconnects the line hold conductors 1–08 from the armatures of relay 1LHT. At its armature 1 relay 1EG1 interrupts the circuit of relay 1LGS which releases and interrupts one of the locking paths for relay 1OST and also releases relay 1LHT. Relay 1EG1 at its armature 2 interrupts the other locking circuit for relay 1OST and that relay releases. Relay 1EG1 completes the circuit of relay 1AVK, the path being traced from battery, through the winding of that relay, conductor 1–14, armature 5 and front contact of relay 1EG1, conductor 1–26, back contact and armature 2 of relay 3VF0, chain circuit through the back contacts and armatures 2 of relays 3VF1, 3VF2 and 3VF3, front contact and armature 1 of relay 3VF4, and conductor 3–06 to grounded conductor 1–12. At its armature 3 the relay 1EG1 interrupts the locking circuit for relay 3VF4 traced through the armature 3 and front contact of that relay but relay 3VF4 remains locked for the time being through its front contact and armature 4, chain circuit through the back contacts and armatures 4 of relays 3VF3, 3VF2, 3VF1 and 3VF0, conductor 3–04 and armature 3 and front contact of relay 1ADV1 to grounded conductor 1–06.

With relay 1AVK operated, the locking circuits of relays 1ADV and 1ADV1 are interrupted and those relays release. Relay 1ADV1 interrupts the locking circuit of relay 3VF4 which releases and interrupts the energizing circuit for relay 1AVK which releases.

The circuit is now completed for the operation of relay 1VFK traced from battery to the winding of that relay, front contact and armature 4 of relay 1EG1, back contact and armature 3 of relay 1OST, back contact and armature 1 of relay 1LHT, conductor 1–27, back contact and armature 5 of relay 3VF0, chain circuit through the back contacts and armatures 5 of relays 3VF1, 3VF2, 3VF3 and 3VF4, conductor 3–02, back contact and armature 4 of relay 1ADV1 to ground, and relay 1VFK operates.

Relay 1VFK interrupts one of the two locking circuits for relay 1EG. The other, as previously traced, includes armature 1 and back contact of relay 2UK. With relay 2FU1 operated, as previously described, and relay 2FU0 held operated, an energizing circuit for relay 2UK is completed, the circuit being traced from battery through the winding of that relay, conductor 2-09, front contact and armature 5 of relay 2FU1, front contact and armature 4 of relay 2FU0, and through a previously traced path including the front contact and armature 3 of each of the relays 2FT0, 2VG0, 4HG0 to grounded conductor 1-02. The operation of relay 2UK serves as a check that two successive ones of the relays 2FU0 to 2FU9 are operated, in this case the relays 2FU0 and 2FU1. Relay 2FU1 having operated, as previously described, locks in a circuit traced from its winding, through its front contact and armature 4 and back contacts and armatures 4 of relays 2FU2 to 2FU8, back contact and armature 3 of relay 2FU9, and through armature 2 and back contact of relay 2TK to grounded conductor 1-02.

Relay 2UK interrupts at its armature 1 and back contact the second of the two locking circuits for relay 1EG and this relay releases in turn releasing relay 1EG1. At its armature 3 the relay 2UK interrupts the circuit of relay 1LLC which releases.

Relay 1EG upon releasing interrupts at its armature 4 the locking circuit for relay 2FU0 which releases, leaving only the relay 2FU1 in that chain operated. Relay 2FU0 interrupts the energizing circuit for relay 2UK which releases and reestablishes the energizing circuit for relay 1LLC which reoperates. Relay 1EG1 releases relay 1VFK and reestablishes the energizing circuit for relay 1LGS. With relay 1LGS operated the previously traced circuit for relay 3VF0 is reestablished to effect the connection of the first line in the second group to the insulation test control circuit. This is the group which is located by the group designations H-0, V-0, in line link frame 01.

The testing of lines of the second group proceeds as previously described with relays 3VF0 to 3VF4 being operated in succession to connect the individual lines in succession for test. Upon the testing of the last line of the group, relays 1EG and 1EG1 are again operated to cause the operation of relay 2FU2, relay 2FU1 remaining locked. With relays 2FU1 and 2FU2 operated, the relay 2UK again operates and releases relays 2FU1 and 1EG, the latter relay in turn releasing relay 1EG1. In the process of advancing to the next group of lines, relay 3VF4 is released and when the advance is completed relay 3VF0 operates to connect the first line of the third group to the insulation test control circuit for testing of the line. This is the group which is located by the group designations H-0, V-0, in line link frame 02.

This procedure is repeated as successive groups of lines are seized for test by successive ones of the relays 2FU3 to 2FU9. Upon the testing of the last line of the group that is seized by relay 2FU9, relays 1ADV and 1ADV1 operate as before to cause the operation of relay 1EG which in turn operates relay 1EG1. With relay 1EG operated, the ground connection on its armature 5 is traced through conductor 1-28, armature 1 and back contact of relay 2FE, chain circuit through armatures 2 and back contacts of relays 2FU0 to 2FU8, armature 1 and front contact of relay 2FU9, armature 1 and front contact of relay 2FT0 and winding of relay 2FT1 to battery and that relay operates and locks in the circuit over which relay 2FT0 was originally operated, the locking circuit including the front contact and armature 4 of relay 2FT1. At the time of operation of relay 2FT1, relay 2FT0 is held operated in a locking circuit traced through its front contact and armature 2, armature 1 and back contact of relay 2VK, conductor 1-24 and front contact and armature 7 of relay 1EG. With relays 2FT0 and 2FT1 operated, an energizing circuit for relay 2TK is completed, the circuit being traced from battery to the winding of that relay, front contact and armature 5 of relay 2FT1, front contact and armature 3 of relay 2FT0, and over a previously traced path including the front contact and armature 3 of relay 2VG0 and the front contact and armature 3 of relay 4HG0 to grounded conductor 1-02. Relay 2TK interrupts the holding circuit for relay 2FU9 at its armature 1 and back contact and prepares an energizing circuit for relay 2UK at the armature 1 and front contact of relay 2TK. With relay 2FU9 released, the ground on conductor 1-02 is extended through a chain circuit comprising the back contact and armature 2 of relay 2FU9, the back contacts and armatures 3 of relays 2FU8 to 2FU0, the armature 1 and front contact of relay 2TK and the winding of relay 2UK to battery and the latter relay operates. Relay 2UK releases relay 1EG which releases relay 1EG1 and also releases relay 2FT0. Relay 2FT0 interrupts the energizing circuit for relay 2TK which releases. With relay 2TK released the circuit of relay 2UK is interrupted at its armature 1 and front contact and relay 2UK releases and the circuit of relay 2FU0 is reestablished at the armature 2 and back contact of relay 2TK and the relay 2FU0 again operates. With relay 2FU0 operated and relay 2UK released, relay 1LLC reoperates to cause the seizure of the group of lines located by the group designations H-0, V-0, in line link frame 10. Incident to the advancement to this group of lines, relay 3VF4 releases and relay 3VF0 operates to connect the first line of the newly seized group to the test circuit for testing of that line.

The sequences of operations, hereinbefore described, are then repeated, the relays 2FU1, 2FU2, etc. being operated in succession after the connection of the last line in the preceding group has been effected by relay 3VF4 and the line has been tested and the testing cycle proceeds to the condition in which relay 2FU9 is again operated and relay 3VF4 has been operated and the line controlled thereby tested. Upon the operations of relays 1ADV and 1ADV1 following the test and the resulting operation of relays 1EG and 1EG1, the relay 2FT2 is operated in a circuit from battery, through its winding, front contact and armature 2 of relay 2FT1, and back contact and armature 1 of relay 2FT0 over the previously traced path by which relay 2FT1 was operated. At the time of operation of relay 2FT2, relay 2FT1 remains locked through its front contact and armature 3 and the back contact and armature 2 of relay 2FT0, armature 1 and back contact of relay 2VK, conductor 1-24, and the front contact and grounded armature 7 of relay 1EG. With the two relays 2FT2 and 2FT1 operated, the relay 2TK again operates and releases the relay 2FU9. This causes the relay 2UK to operate and when the relay 1EG releases the relay 2FT1 releases, in turn releasing relay 2TK which releases relay 2UK and reoperates relay 2FU0. Each time the relay 1EG operates with relay 2FU9 operated, ground is extended to lock the then operated one of the relays 2FT0 to 2FT5 and the next higher numbered one of those relays is operated and locked. With two of them operated, the relay 2TK operates and releases the relay 2FU9. This causes the relay 2UK to operate and when the relay 1EG releases, the lower numbered one of the relays 2FT0 to 2FT5 releases, in turn releasing relay 2TK which releases relay 2UK and reoperates relay 2FU0. This process continues until the last of the frame tens relays has operated, in this case the relay 2FT5 representing, with the other relays of the series, an office having sixty line link frames, each of the relays being associated with ten such frames.

With relay 2FU9 and relay 2FT5 operated and the last group of lines as selected by relay 2FU9 tested, this being the group located by the group designations H-0, V-0, in line link frame 59, the operation of relay 1EG for advancing to the next line group causes the completion of a locking circuit for relay 4VG0 traced from battery through the winding of that relay, front contact and armature 2, conductor 2-08, armature 1 and back contact of relay 2HK, conductor 1–22 and front contact and armature 6 of relay 1EG as previously described. With relay 1EG operated and relays 2FU9, 2FT5 and 4VG0 operated, an energizing circuit for relay 4VG1 is completed, the circuit being traced from battery, through the winding of that relay, front contact and armature 1 of relay 4VG0, conductors 4–06 and 2–11, front contact and armature 2 of relay 2FT5, chain circuit through back contacts and armatures 2 of relays 2FT4 to 2FT1, back contact and armature 1 of relay 2FT0, front contact and armature 1 of relay 2FU9, chain circuit through back contacts and armatures 2 of relays 2FU8 to 2FU0, back contact and armature 1 of relay 2FE, conductor 1–28 and front contact and armature 5 of relay 1EG to ground and relay 4VG1 operates. It locks in a circuit traced through its front contact and armature 3, chain circuit through the back contacts and armatures 3 of relays 4VG2 to 4VG11, conductor 2–01 and armature 2 and back contact of relay 2HK to grounded conductor 1–02. With relays 4VG0 and 4VG1 operated, an energizing circuit for relay 2VK is traced from battery, through its winding, conductor 2–12, front contact and armature 4 of relay 4VG1, front contact and armature 3 of relay 4VG0, conductors 4–01 and 4–02, chain circuit through the back contacts and armatures 4 of relays 4HG9 to 4HG1, front contact and armature 3 of relay 4HG0 and conductors 4–03, 4–04 and 2–02 to grounded conductor 1–02. Relay 2VK operates and interrupts at its back contact and armature 3 a locking circuit for relay 2FT5 traced through the armature 4 and front contact of that relay. At its armature 1 the relay 2VK completes the circuit of relay 2TK, traced from battery through the winding of relay 2TK, front contact and armature 1 of relay 2VK, chain circuit through the armature 2 and back contact of relay 2FT0 armatures 3 and back contacts of relays 2FT1 to 2FT5, the latter now being released, and conductors 2–13 and 2–14 to grounded conductor 1–02. Relay 2TK releases relay 2FU9 and completes the circuit of relay 2UK, as previously described, through make contacts of relay 2TK and break contacts of all of the relays 2FU0 to 2FU9.

Relay 2UK releases relay 1EG which in turn releases relay 4VG0. This causes relays 2VK, 2TK and 2UK to release in turn. When relay 2VK releases, relay 2FT0 reoperates in a circuit traced from battery, through its winding, chain circuit through the armatures 4 and back contacts of relays 2FT1 to 2FT5, and armature 3 and back contact of relay 2VK to grounded conductor 1–02, and when relay 2TK releases, relay 2FU0 reoperates through break contacts of the other relays in the series 2FU0 to 2FU9 and the break contacts of relay 2TK. Relay 2UK reestablishes the operating circuit for relay 1LLC and this causes the seizure of the first group of lines in the next frame. Incident to the advancement to that group of lines, relay 3VF4 releases and relay 3VF0 operates to connect the first line of the newly seized group to the insulation test control circuit. The group of lines seized is located by the group designations H–0, V–1 in line link frame 00.

The testing of lines continues, relays 2FT1, 2FT2, etc., being operated at the end of each cycle of the chain comprising relays 2FU0 to 2FU9 until the chains have again reached the condition in which relays 3VF4, 2FU9 and 2FT5 are operated, and the testing of the group of lines seized under the control of relay 2FU9 has been completed. This group is located by the group designations H–0, V–1 in line link frame 59. Relays 1ADV and 1ADV1 operate and relay 1EG also operates, providing a locking circuit for relay 4VG1 traced through the front contact and armature 2 of that relay and the back contact and armature 2 of relay 4VG0, conductor 2–08, armature 1 and back contact of relay 2HK and conductor 1–22 and the front contact and armature 6 of relay 1EG to ground. Relay 4VG2 operates in a circuit traced from battery through its winding, front contact and armature 1 of relay 4VG1, back contact and armature 1 of relay 4VG0, conductors 4–06 and 2–11, front contact and armature 2 of relay 2FT5, chain circuit through the back contact and armatures 2 of relays 2FT4 to 2FT1, back contact and armature 1 of relay 2FT0, front contact and armature 1 of relay 2FU9, chain circuit through the back contacts and armatures 2 of relays 2FU8 to 2FU0, back contact and armature 1 of relay 2FE, conductor 1–28, front contact and armature 5 of relay 1EG. With relays 4VG2 and 4VG1 operated, the energizing circuit for relay 2VK is completed and this relay operates to effect the release of relay 2FT5 and the operation of relay 2TK. The latter relay releases relay 2FU9 and operates relay 2UK. This relay releases relay 1EG which in turn releases relay 4VG1. As in the case of the release of relay 4VG0, the relays 2VK, 2TK and 2UK release in turn, relay 2TK causing the reoperation of relay 2FU0, the release of relay 2UK causing the reoperation of relay 1LLC. With relay 1LLC reoperated, relay 3VF4 releases and relay 3VF0 reoperates, and the testing of lines continues, with the chain of relays 2FU0 to 2FU9 operating through six cycles while the chain of relays 2FT0 to 2FT5 operates through one cycle.

Each time that the relay chain 2FT0 to 2FT5 completes a cycle the chain comprising relays 4VG0 to 4VG11 advances one step and finally a condition is reached in which relays 3VF4, 2FU9, 2FT5 and 4VG11 are operated and the last line of the group seized under the control of relay 2FU9 has been tested. This group is located by the group designation H–0, V–11 in line link frame 59. Relay 1EG then operates and causes relay 4HG0 to lock through its front contact and armature 2, conductor 1–19 and the front contact and armature 3 of relay 1EG to ground. Relay 1EG also completes an energizing circuit for relay 4HG1, the path being traced from battery, through the winding of that relay, front contact and armature 1 of relay 4HG0, front contact and armature 1 of relay 4VG11, chain circuit through the back contacts and armatures 1 of relays 4VG10 to 4VG0, conductors 4–06 and 2–11, front contact and armature 2 of relay 2FT5, chain circuit through the back contact and armatures 2 of relays 2FT4 to 2FT1, back contact and armature 1 of relay 2FT0, front contact and armature 1 of relay 2FU9, chain circuit through the back contacts and armatures 2 of relays 2FU8 and 2FU0, back contact and armature 1 of relay 2FE, conductor 1–28 and the front contact and armature 5 of relay 1EG to ground. With relays 4HG1 and 4HG0 operated an energizing circuit for relay 2HK is completed, the circuit being traced from battery through the winding of that relay, conductor 2–16, front contact and armature 4 of relay 4HG1, front contact and armature 3 of relay 4HG0, conductors 4–03, 4–04 and 2–02 to grounded conductor 1–02.

Relay 2HK interrupts the locking circuits for relay 4VG11, one of those circuits being traced from ground through the armature 6 and front contact of relay 1EG, conductor 1–22, back contact and armature 1 of relay 2HK, conductor 2–08, chain circuit through the armatures 2 and back contacts of relays 4VG0 to 4VG10, armature 2 and front contact of relay 4VG11 to its winding, the other being traced from grounded conductor 1–02, through the back contact and armature 2 of relay 2HK, conductor 2–01, the front contact and armature 3 of relay 4VG11 to its winding. Relay 4VG11 upon releasing completes the circuit of relay 2VK in a path traced from battery, through the winding of that relay, front contact and armature 1 of relay 2HK, the path just traced to the armature 2 of relay 4VG11, and over the back contact associated with that armature and conductor 2–02 to grounded conductor 1–02. Relay 2VK interrupts the circuit of relay 2FT5 which releases and causes relay 2TK to operate. This relay releases the relay 2FU9 which causes relay 2UK to operate as before. Relay 2UK releases relay 2EG which unlocks relay 4HG0 which releases. This causes the relays 2HK, 2VK, 2TK and 2UK to release in turn. When relay 2HK releases, relay 4VG0 reoperates through break contacts of all of the other relays in the series and break contacts of relay 2HK. When relay 2VK releases, relay 2FT0 reoperates and when relay 2TK releases, relay 2FU0 reoperates over paths as previously described. When relay 2UK releases the circuit of relay 1LLC is completed, relay 3VF4 releases, relay 3VF0 reoperates and the testing of lines in a new horizontal group as selected by relay 4HG1 proceeds. The relay 2VK is used for vertical group advance to check that two of the relays 4VG0 to 4VG11 are operated and for horizontal group advance to check that all of those relays are released. The group of lines seized is located by the designations H–1, V–0 in line link frame 00.

Upon the next occurrence of concurrent operation of relays 3VF4, 2FU9, 2FT5 and 4VG11, after the testing of the last line of the group seized by relay 2FU9, relay 1EG again operates, locks relay 4HG1, and causes the operation of relay 4HG2. With these two relays operated, the circuit of relay 2HK is again completed, this time through the front contact and armature 4 of relay 4HG2 and the front contact and armature 5 of relay 4HG1. Relay 2HK initiates the previously described sequence of operations which comprises the operation of relays 2VK, 2TK and 2UK, the release of relays 4VG11, 2FT5 and 2FU9 and the reoperation of relays 4VG0, 2FT0 and 2FU0, the release of relays 1EG, 2TK and 2UK, the reoperation of relay 1LLC, the release of relay 3VF4, and the reoperation of relay 3VF0. The testing continues and each time the relays 4VG11, 2FT5, 2FU9 and 3VF4 are concurrently operated, the chain circuit comprising relays 4HG0 to 4HG9 is advanced one step until finally the relays 4HG9, 4VG11, 2FT5, 2FU9 and 3VF4 are concurrently operated and the last line in the group seized by relay 2FU9 has been tested. This group is located by the designations H–9, V–11 in line link frame 59. Relay 1EG operates and completes the circuit of relay 4EC1, the operating path being traced from battery through the winding of that relay, break contacts controlled by the upper armature of relay 4EC, front contact and armature 1 of relay 4HG9, chain circuit through the back contacts and armatures 1 of relays 4HG8 to 4HG0, front contact and armature 1 of relay 4VG11, chain circuit through the back contacts and armatures 1 of relays 4VG10 to 4VG0, conductors 4–06, 2–11, front contact and armature 2 of relay 2FT5, chain circuit through the back contacts and armatures 2 of relays 2FT4 to 2FT1, back contact and armature 1 of relay 2FT0, front contact and armature 1 of relay 2FU9, chain circuit through the back contacts and armatures 2 of relays 2FU8 to 2FU0, back contact and armature 1 of relay 2FE, conductor 1–28 and front contact and armature 5 of relay 1EG to ground. At its upper armature relay 4EC1 connects relay 4EC to its own energizing circuit and relay 4EC operates in parallel with relay 4EC1. At its upper armature and make-before-break contacts relay 4EC, which has a slow operate characteristic, locks to the ground supplied through armature 1 and front contact of relay 4HG9, and releases relay 4EC1. Relay 4EC1 is used to control the operation of a register (not shown) which registers the completion of the test initiated by operation of key 1–01 and relay 1ON. With relay 4EC1 released and relay 4EC operated, ground is connected through the lower armature and back contact of relay 4EC1, the front contact and lower armature of relay 4EC and conductor 4–07 to operate relay 1RN. The path includes a dotted section to indicate that the operation of relay 1RN may result from a sequence of operations initiated by the release of relay 4EC1 with relay 4EC operated. Relay 1RN, upon operating, opens the locking circuit for relay 1ON. With this relay released, ground is disconnected from conductors 1–02, 1–12 and 1–06 extending to all of the then operated relays, including relays 4EC, 4HG9, 4VG11, 2FT5, 2FU9, 3VF4, 1EG and 1EG1 which are released and the entire system is restored to normal with none of the relays in the drawings operated and none capable of operating until key 1–01 is again operated.

It may happen that in certain offices there may be more than ten line link frames but not a multiple of ten. In these offices it is necessary to count through one or more full cycles of the relays 2FU0 to 2FU9 and then through a partial cycle whereupon the advance path must be extended to the vertical group relays 4VG0 to 4VG11. At this point, the frame units and frame tens relays corresponding to the units and tens digits respectively of the last frame number are operated.

The relay 2FE is provided in these offices. It operates after the last line link frame has been selected for test when relay 1EG releases or when relay 2FU0 operates. Its operating path is traced from battery through the winding of the relay to the armatures 1 of each of the relays 2FT1 to 2FT5. It will be assumed that the office contains forty-seven frames, numbered 00 to 46. A cross-connection would be made as indicated by the dotted conductor path 2–17 from the front contact associated with armature 1 of relay 2FU6 to the front contact associated with armature 1 of relay 2FT4. It will further be assumed that relays 2FT4 and 2FU5 are operated, that relay 3VF4 operates to connect the last line in the group seized under the control of relay 2FU5 and that the testing of that line is completed. Relays 1ADV and 1ADV1 operate and complete the circuit of relay 1EG which operates as previously described. Relay 1EG connects ground over its armature 5 and front contact, conductor 1–28, armature 1 and back contact of relay 2FE, chain circuit through armatures 2 and back contacts of relays 2FU0 to 2FU4, armature 2 and front contact of relay 2FU5 and winding of relay 2FU6 to battery and that relay operates. At its armature 7 relay 1EG disconnects ground from conductor 1–23 to which the armature 1 of relay 2FU6 is connected. With relays 2FU5 and 2FU6 operated the circuit of relay 2UK is completed and that relay releases relay 1EG, and the testing of the group of lines seized under control of relay 2FU6 is started.

With relay 1EG released, a path from ground is traced over its armature 7 and back contact, conductor 1–23, armature 1 and front contact of relay 2FU6, cross-connection 2–17, front contact and armature 1 of relay 2FT4, and winding of relay 2FE to battery and that relay operates. Relay 2FE locks through its front contact and armature 2 and the break contacts controlled by armature 2 of relay 2UK to grounded conductor 1–02. At its armature 3 the relay 2FE prepared a locking circuit for relay 2VK. At its armature 1 it transfers the circuit path of conductor 1–28 from its back contact to its front contact.

After the last line in the group seized under the control of relay 2FU6 has been tested, relay 1EG again operates and applies ground through its armature 5 and front contact to conductor 1–28 but instead of the path being extended to the winding of relay 2FU7 in a path prepared at the armature 2 and front contact of relay 2FU6, the path is extended through the armature 1 and front contact of relay 2FE and conductor 4–06 to the armature 1 of relay 4VG0 from which the path will be continued in a chain circuit through the armatures 1 and back contacts of all of those relays that had been previously operated and released and through the armature 1 and front contact of that relay in the series 4VG0 to 4VG11 that is then operated and to the winding of the next relay in the series which operates.

The two operated relays in the chain of relays 4VG0 to 4VG11 complete the circuit of relay 2VK in the manner hereinbefore described and that relay operates. At its armature 3 relay 2VK interrupts the locking circuit of relay 2FT4 which releases. At its armature 2 the relay 2VK completes a locking circuit prepared for it at the armature 3 and front contact of relay 2FE. At its armature 1 the relay 2VK completes the circuit of relay 2TK which operates. Relay 2TK interrupts at its armature 2 the locking circuit for relay 2FU6 which releases and at its armature 1 the relay 2TK completes the circuit of relay 2UK which operates. Relay 2UK releases relay 1EG which in turn releases the first of the two relays in the relay chain 4VG0 to 4VG11 that is operated. Relay 2UK also interrupts the locking circuit for relay 2FE which releases. This leaves relay 2VK only under the control of the relay chain 4VG0 to 4VG11 and with the release of one of the two operated relays in that chain by relay 1EG, the relay 2VK releases, in turn releasing relay 2TK which releases relay 2UK. The release of relay 2VK serves as a check upon the release of relay 2FE because if the latter relay failed to release the relay 2VK would remain operated after the release of one of the operated relays in the chain 4VG0 to 4VG11. When relay 2VK releases relay 2FT0 reoperates and when relay 2TK releases relay 2FU0 reoperates in the manner hereinbefore described. In this way advancement of the vertical group relay chain is effected each time the testing of lines seized under the control of relays 2FU6 and 2FT4 is completed and the relay chains 2FT0 to 2FT5 and 2FU0 to 2FU9 are returned to the beginning of new cycles without further advancement of either chain.

It was previously stated that relay 2FE operates when relay 1EG releases or when relay 2FU0 operates. For the purpose of showing the manner in which the operation of relay 2FE is dependent upon the operation of relay 2FU0 rather than upon the release of relay 1EG it will be assumed that the office contains forty-one frames instead of forty-seven. Cross-connection 2–17 would then extend from the front contact associated with armature 1 of relay 2FU0 to the front contact associated with armature 1 of relay 2FT4. It will further be assumed that relays 2FT3 and 2FU9 are operated, that relay 3VF4 has operated to connect the last line in the group seized under the control of relay 2FU9, and that the testing of that line is completed. Relays 1ADV and 1ADV1 operate and complete the circuit of relay 1EG which operates as previously described. Relay 1EG connects ground through its armature 5 and front contact, conductor 1–28, armature 1 and back contact of relay 2FE, chain circuit through armatures 2 and back contacts of relays 2FU0 to 2FU8, armature 1 and front contact of relay 2FU9, armature 1 and back contact of relay 2FT0, armatures 2 and back contacts of relays 2FT1 and 2FT2, armature 2 and front contact of relay 2FT3 and winding of relay 2FT4 to battery and that relay operates. With relays 2FT3 and 2FT4 operated, an energizing circuit for relay 2TK is completed as previously described and that relay unlocks the relay 2FU9 which releases. With relay 2FU9 released the circuit of relay 2UK is completed through the armature 1 and front contact of relay 2TK and relay 2UK operates. Relay 2UK releases relay 1EG which releases relay 1EG1 and also the relay 2FT3. Relay 2FT3 interrupts the energizing circuit for relay 2TK which releases. This relay releases relay 2UK and also completes at its back contact and armature 2 the circuit of relay 2FU0 which reoperates. With relay 2FU0 operated an energizing circuit for relay 2FE is traced from ground through armature 7 and back contact of relay 1EG, conductor 1–23, armature 1 and front contact of relay 2FU0 and the assumed cross-connection to the front contact associated with armature 1 of relay 2FT4 from which the path continues through that front contact to the winding of relay 2FE to battery. After the testing of the lines seized under the control of relay 2FU0, the advancement to the next line group involves an advancement in the vertical group relay chain under the control of relay 2FE and the return of the frame units and frame tens chains to the beginning of new cycles. It is noted from the foregoing description that relay 2FE does not operate immediately upon the release of relay 1EG when the circuit of relay 2FE is under the control of relay 2FU0, because the advancement of the frame units chain to the beginning of a new cycle does not involve concurrent operation of two relays of that chain as in the case of any other advancement in chain, but involves instead the release of the last relay in the chain and the determination by relay 2TK of the fact that none of the relays in that chain is operated before relay 2FU0 reoperates.

Although a specific embodiment of the invention has been shown in the drawings and described in the foregoing specification, it will be understood that the invention is not limited to the specific embodiment disclosed but is capable of modification, rearrangement and substitution of parts and elements without departing from the spirit of the invention.

What is claimed is:

1. In a line selection system, means for selecting a line including a plurality of chains of relays, means for successively operating the relays of one chain under the control of a preceding chain, indicating means individual to each chain, means responsive to the operation of an additional relay of each chain to operate its individual indicating means to indicate that the said additional relay has been operated, means to restore each chain to normal and means under the control of a succeeding chain to operate said indicating means responsive to the restoration to normal of the chain to which said indicating means is individual.

2. In a line selection system, means for selecting lines including a plurality of chains of relays, means controlled by the operation of the last relay of a relay chain for operating an additional relay of the next chain, means individual to each chain for indicating that an additional relay of said chain has operated, and means controlled by said indicating means for causing the restoration of the preceding chain to normal.

3. In a line selection system, means for selecting lines to be tested including a chain of relays, continuity paths controlled by said relays whereby each relay except the last prepares the energizing circuit for the next relay in the chain, and means operable over a circuit completed by two operated ones of said relays for indicating that two are operated.

4. In a line selection system, means for selecting lines to be tested including a chain of relays, continuity paths controlled by said relays whereby each relay except the last prepares the energizing circuit for the next relay in the chain, means operable over a circuit completed by two operated ones of said relays for indicating that two are operated, and means controlled by said indicating means for releasing the first of said two operated relays.

5. In a line selection system, means for selecting lines to be tested including a plurality of chains of relays, means controlled by the operation of the last relay of a relay chain for operating an additional relay of the next chain, means individual to each chain for indicating that an additional relay of said chain has operated, means controlled by said indicating means for causing the restoration of the preceding chain, means for restoring said indicating means to normal, and means responsive to restoration of said indicating means for operating the first relay of the preceding chain.

6. In a line selection system, means for selecting lines to be tested including a plurality of chains of relays, means controlled by the operation of the last relay of a relay chain for operating an addditional relay of the next chain, means to normal, and means responsive to restoration of additional relay of said chain has operated, means controlled by said indicating means for causing the restoration of the preceding chain, means responsive to restoration of said preceding chain for restoring said indicating means to normal, and means responsive to restoration of said indicating means for operating the first relay of the preceding chain.

7. In a line selection system, means for selecting lines to be tested including a plurality of chains of relays, means controlled by the operation of the last relay of a relay chain for operating an additional relay of the next chain, means individual to each chain for indicating that an additional relay of said chain has operated, and means controlled by said indicating means for causing the restoration of the preceding chain to normal, the indicating means individual to said preceding chain being operable in response to restoration of that chain.

8. In a line selection system, means for selecting lines to be tested including a plurality of chains of relays, means controlled by the operation of the last relay of a relay chain for operating an additional relay of the succeeding chain, and means for causing the operation of a relay other than the last of one of said chains to restore the succeeding chain.

9. In a line selection system, means for selecting lines to be tested including a plurality of chains of relays, means controlled by the operation of the last relay of a relay chain for operating an additional relay of the succeeding chain, and means for causing the operation of a relay other than the last of one of said chains to restore the succeeding chain, said succeeding chain causing the restoration of said one chain and thereby effecting the by-passing of a portion of said one chain.

10. In a line selection system, means for selecting lines to be tested including a plurality of chains of relays, means controlled by the operation of the last relay of a relay chain for operating an additional relay of the succeeding chain, means for causing the operation of a relay other than the last of one of said chains to operate an additional relay of the second succeeding chain, and means controlled by said second succeeding chain for initiating the restoration of all chains preceding it, thereby effecting the by-passing of a portion of said one chain.

11. In a line selecting system, a plurality of chains of relays, each chain including a plurality of relays, an operating circuit for the relays of each chain, indicating means individual to each chain, means for initially operating the first relay of each chain, continuity paths controlled by the relays of each chain for extending the operating circuit from relay to relay, means for repeatedly closing the operating circuit for the first chain, means whereby the operation of the last relay of each chain closes the operating circuit for the next chain to operate an additional relay in said next chain, means whereby the operation of said additional relay operates the indicating means individual to said next chain, means whereby the operation of the indicating means individual to said next chain releases the last relay of the preceding chain, means whereby the release of said last relay, with the indicating means of said next chain operated, operates the indicating means individual to said preceding chain, and means whereby the operation of the indicating means individual to said preceding chain recloses the initial operating circuit for the first relay of said preceding chain.

12. In a line selecting system, a plurality of chains of relays, means for successively and repeatedly operating the relays of one chain, means whereby each operation of the last relay of said one chain successively and repeatedly operates the relays of a succeeding chain, indicating means individual to each chain, means whereby the operation of each relay of a chain except the first operates said indicating means, means whereby said indicating means releases the last relay of the preceding chain, and means whereby the release of the last relay of said preceding chain operates the indicating means individual to said preceding chain.

References Cited in the file of this patent

UNITED STATES PATENTS

| | | |
|---|---|---|
| 1,881,544 | Hartley | Oct. 11, 1932 |
| 2,337,411 | Peterson | Dec. 21, 1943 |
| 2,375,413 | Guenther | May 8, 1945 |
| 2,535,513 | Ostline | Dec. 26, 1950 |
| 2,632,817 | Kessler | Mar. 24, 1953 |